United States Patent
Han et al.

(10) Patent No.: US 10,106,717 B2
(45) Date of Patent: Oct. 23, 2018

(54) COMPOSITE PHASE CHANGE MATERIAL (PCM), METHOD FOR MANUFACTURING A COMPOSITE PCM, AND ARTICLE OF CLOTHING INCLUDING A COMPOSITE PCM

(71) Applicant: Honeywell International Inc., Morristown, NJ (US)

(72) Inventors: Jeffrey Han, Shanghai (CN); Wei Jun Wang, Shanghai (CN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/590,870

(22) Filed: Jan. 6, 2015

(65) Prior Publication Data
US 2015/0197678 A1     Jul. 16, 2015

Related U.S. Application Data

(60) Provisional application No. 61/926,685, filed on Jan. 13, 2014.

(51) Int. Cl.
*C09K 5/06*     (2006.01)
*A41D 1/00*     (2018.01)

(52) U.S. Cl.
CPC .................................. *C09K 5/063* (2013.01)

(58) Field of Classification Search
CPC ..................................................... C09K 5/063
USPC .......................................................... 252/75
See application file for complete search history.

(56) References Cited

U.S. PATENT DOCUMENTS

| | | | | |
|---|---|---|---|---|
| 4,708,812 | A * | 11/1987 | Hatfield | B01J 13/16 118/62 |
| 4,908,166 | A * | 3/1990 | Salyer | C08K 5/01 252/70 |
| 4,908,238 | A * | 3/1990 | Vigo | D01F 1/00 427/389 |
| 5,478,867 | A * | 12/1995 | Tabor | C08G 18/092 521/128 |

(Continued)

FOREIGN PATENT DOCUMENTS

| | | |
|---|---|---|
| CN | 2726340 Y | 9/2005 |
| CN | 1908258 A | 2/2007 |

(Continued)

OTHER PUBLICATIONS

An English Translation of Zhang.*

(Continued)

*Primary Examiner* — Nicole M Buie-Hatcher
*Assistant Examiner* — M. Reza Asdjodi
(74) *Attorney, Agent, or Firm* — Roberts & Roberts, LLP; Richard S. Roberts, Jr.

(57) ABSTRACT

Composite phase change materials, methods for manufacturing composite phase change materials, and articles of clothing including composite phase change materials for temperature regulation are provided. In one example, a composite phase change material includes a cross-linked polyethylene glycol matrix and a phase change material filler. Each of the cross-linked polyethylene glycol matrix and the phase change material filler has a phase change temperature of from about 10 to about 60° C. Further, the composite phase change material has a latent heat of enthalpy greater than about 50 kJ/kg.

17 Claims, 3 Drawing Sheets

(56) References Cited

U.S. PATENT DOCUMENTS

| | | | |
|---|---|---|---|
| 5,565,132 A | 10/1996 | Salyer | |
| 6,004,662 A * | 12/1999 | Buckley | A41D 31/0038 152/310 |
| 6,207,738 B1 | 3/2001 | Zuckerman et al. | |
| 7,794,657 B2 * | 9/2010 | Stewart | G01N 33/54373 422/50 |
| 2002/0054964 A1 * | 5/2002 | Hartmann | C09K 5/06 428/1.2 |
| 2002/0164474 A1 * | 11/2002 | Buckley | A41D 31/0038 428/308.4 |
| 2005/0208286 A1 * | 9/2005 | Hartmann | C08J 3/201 428/292.1 |
| 2007/0144386 A1 * | 6/2007 | Langlais, II | B41C 1/1016 101/467 |
| 2010/0020145 A1 * | 1/2010 | Gervasi | B41J 2/17593 347/88 |
| 2010/0171067 A1 | 7/2010 | Hu et al. | |
| 2013/0228308 A1 | 9/2013 | Abhari | |
| 2014/0170346 A1 * | 6/2014 | Adam | C09K 5/063 428/35.7 |
| 2015/0197678 A1 * | 7/2015 | Han | C09K 5/063 252/73 |

FOREIGN PATENT DOCUMENTS

| | | | | |
|---|---|---|---|---|
| CN | 101701146 A | * | 5/2010 | |
| CN | 101701146 B | * | 10/2011 | |
| CN | 102744942 A | | 10/2012 | |
| KR | 20130116992 A | | 10/2013 | |
| WO | 2001005581 A9 | | 2/2001 | |
| WO | 2014006464 | | 1/2014 | |
| WO | WO 2014041323 A1 * | | 3/2014 | C08G 18/4833 |
| WO | 2014071528 A1 | | 5/2014 | |

OTHER PUBLICATIONS

Saihi et al. (Reactive & Functional Polymers, 66 (2006) 1118-1125).*

The International Search Report dated Apr. 24, 2015 in International Application No. PCT/US2015/010723.

Mondal et al., Phase change materials for smart textiles—An overview, Applied Thermal Engineering, vol. 28, Issues 11-12, Aug. 2008, pp. 1536-1550.

Tan et al., Preparation and properties studies of paraffin/high density polyethylene composites and phase-change coatings, Progress in Organic Coatings 76 (2013) 1761-1764.

Karaman et al., Polyethyleneglycol(PEG)/diatomite-compositeasanovelform-stablephase change materialfor thermalenergystorage, Solar Energy Materials & Solar Cells 95 (2011) 1647-1653.

Alkan et al., Preparation, Thermal Properties and Thermal Reliability of Form-Stable Paraffin/Polypropylene Composite for Thermal Energy Storage, J Polym Environ (2009) 17:254-258.

Zhang et al., Preparation and Characterization of Heat-Storage and Thermo Regulated Composite Material by Reaction Extrusion, Advanced Materials Research vols. 821-822 (2013) pp. 76-79.

Extended European Search Report for EP15735450.7.

* cited by examiner

COMPOSITE PHASE CHANGE MATERIAL (PCM), METHOD FOR MANUFACTURING A COMPOSITE PCM, AND ARTICLE OF CLOTHING INCLUDING A COMPOSITE PCM

CROSS-REFERENCE TO RELATED APPLICATIONS

This application claims the benefit of U.S. Provisional Application No. 61/926,685, filed Jan. 13, 2014.

TECHNICAL FIELD

The technical field generally relates to phase change materials. More particularly, the technical field relates to composite phase change materials, methods for manufacturing composite phase change materials, and articles of clothing including composite phase change materials for temperature regulation.

BACKGROUND

Temperature regulating clothing is useful and often necessary for people who work, live, or recreate in or near high temperatures. In addition to the extreme example of firefighting, many other types of occupations require clothing that protects workers from elevated temperatures. While these workers typically are not required to work near active fires, they may be exposed to naturally elevated temperatures, such as in hot desert or tropical climates, or exposed to temperatures that are elevated due to the proximity of heated equipment (e.g., boilers, kilns, forges, welders) and/or materials (e.g., molten steel, hot asphalt). Even extreme generation of body heat may necessitate the use of temperature regulating clothing, especially when clothing that traps in the body's heat is worn (e.g., non-permeable protection suits, welding aprons).

A number of technologies are used in clothing to regulate temperature. For example, some clothing for firefighters has reflective components that reflect heat from flames away from the body. Firefighter clothing may include insulative components that insulate the body from high ambient temperatures. Active technologies, such as pump-driven water cooling, are also occasionally used in protective clothing. However, these technologies are inadequate and/or impractical to protect a typical mobile worker or sports participant from oppressive heat.

In recent years, clothing manufacturers have incorporated passive cooling technologies into clothing such as vests, shirts, jackets, trousers, gloves, shoes, etc. For example, some clothing incorporates bladders of liquid that can be frozen solid before wear. During wear, cooling is provided by the melting of the solid to liquid. A drawback of such technology is the requirement that the clothing be frozen before each use. In addition, the use of bladders increases the chance of fluid leakage, such as due to failure of the bladder materials.

As such, manufacturers have occasionally attempted to utilize a phase change material that is able to release and absorb heat during its transition between solid and liquid phases. Phase change materials are useful for temperature regulation because of the comparatively small temperature change during phase transition. Generally, most utilized phase change materials perform a solid-to-liquid phase change when the temperature reaches the phase change materials' melting point or phase change point. Accordingly, a micro- or macro-encapsulation is typically used to prevent flow and leakage when solid-to-liquid phase change materials are used in temperature regulating clothing. For example, in US 2011/0056622 A1, a phase change material derived from natural sources (e.g., plant oils) is encapsulated with a bladder formed from a polymer membrane. However, such cumbersome macro-encapsulations, such as bladders and packages, hinder the movement of users and increase the risk of leakage.

The integration of polymers with a phase change material has permitted the pelletization of phase change materials, see, e.g., U.S. Pat. No. 4,587,279, U.S. Pat. No. 5,765,389, and U.S. Pat. No. 6,047,106, in which polyethylene glycol (PEG) is blended with a polymer to form pellets useful in energy storage or deicing. However, such technology has not proven to be safe for use in temperature regulating clothing applications that are able to efficiently control the microclimate of a human body under a comfortable temperature. Accordingly, there remains a need for improved materials that can safely, practically, and efficiently control the microclimate of a human body in temperature regulating clothing.

BRIEF SUMMARY

Composite phase change materials, methods for manufacturing composite phase change materials, and articles of clothing including composite phase change materials for temperature regulation are provided. In an exemplary embodiment, a composite phase change material includes a cross-linked polyethylene glycol matrix and a phase change material filler. Each of the cross-linked polyethylene glycol matrix and the phase change material filler has a phase change temperature of from about 10 to about 60° C. Further, the composite phase change material has a latent heat of enthalpy greater than about 50 kJ/kg.

In another embodiment, a method for manufacturing a composite phase change material is provided. The method includes adding polyethylene glycol and a phase change material filler to a solvent. The method mixes the polyethylene glycol, the phase change material filler, and the solvent to uniformity. The method also includes casting the polyethylene glycol, the phase change material filler, and the solvent into a mold. The method volatilizes the solvent.

In another embodiment, an article of clothing comprising a composite phase change material is provided. For such an article of clothing, the composite phase change material includes a cross-linked polyethylene glycol matrix and a phase change material filler. Each of the cross-linked polyethylene glycol matrix and the phase change material filler has a phase change temperature of from about 10 to about 60° C. Further, the composite phase change material has a latent heat of enthalpy greater than about 50 kJ/kg.

BRIEF DESCRIPTION OF THE DRAWINGS

The various embodiments will hereinafter be described in conjunction with the following drawing figures, wherein like numerals denote like elements, and wherein.

DETAILED DESCRIPTION

Figure 1:
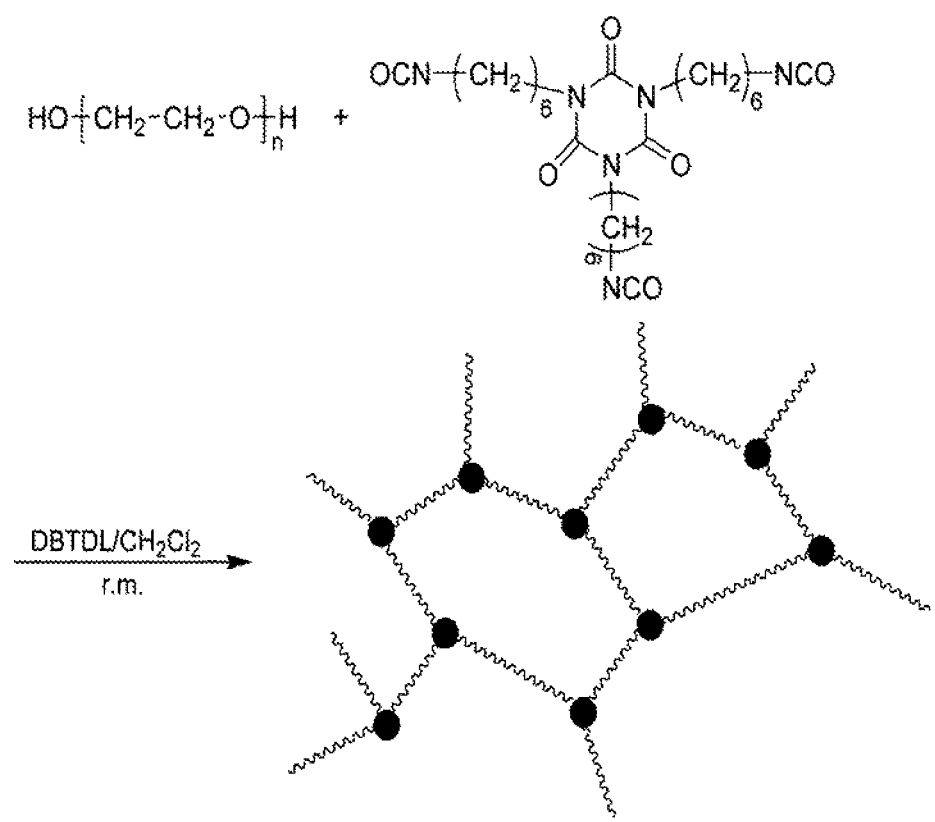
FIG. 1 is an illustration of a xerogel reaction scheme according to exemplary embodiments.

The following Detailed Description is merely exemplary in nature and is not intended to limit the composite phase change materials, methods for manufacturing composite phase change materials, and articles of clothing including composite phase change materials described herein. Furthermore, there is no intention to be bound by any theory presented in the preceding Background or the following Detailed Description.

A composite phase change material (composite PCM) contemplated herein meets the need for improved materials in temperature regulating clothing by providing a cross-linked polyethylene glycol (PEG) applied as a matrix material network that supports a phase change material filler. The phase change material filler is immobilized and entangled into the network. As a result, the composite PCM can remain in a stable shape even when the temperature is higher than the composite PCM's phase change temperature. An exemplary composite PCM further includes a surface coating or surface layer that protects the composite PCM by preventing water uptake, stains and abrasion. Therefore, the composite PCM can be utilized as a separate material in temperature regulating clothing within unsealed packages, i.e., the composite PCM is inherently sealed by the surface coating and does not require addition packaging such as bladders.

In an exemplary embodiment, a composite PCM is composed of a matrix material, a phase change material filler or filling material, a surfactant, and a surface coating. Optionally, the composite PCM may include additives. More specifically, an exemplary matrix material is a cross-linked polymer network based on polyethylene glycol, an exemplary phase change material filler is a free PCM immobilized into the network, and an exemplary surface coating material provides a continuous layer on and surrounding the network. In this composite PCM, both the phase change material filler and the matrix materials perform the function of thermal storage and temperature regulation. The synergetic effect of all components forms a composite PCM with a phase change temperature of from about 10 to about 60° C., a latent heat of enthalpy greater than about 50 kJ/kg, and shape stability. In an exemplary embodiment, the composite PCM has a phase change temperature of from about 25 to about 35° C.

The phase change temperature of the polyethylene glycol network of various embodiments depends on the molecular weight of the polyethylene glycol. In addition, the molecular weight of the polyethylene glycol affects the cross-linking density and mechanical strength of the composite PCM. Accordingly, a series of polyethylene glycol with different molecular weights, and combinations thereof, were evaluated and tested as matrix, network or substrate materials. Generally, polyethylene glycol having a molecular weight of from about 600 to about 20,000 may be used to form the composite PCM. In an exemplary embodiment, polyethylene glycol having a molecular weight of from about 600 to about 6000 is used to form the composite PCM. Generally, cross-linking agents such as polyisocyanate, polyepoxy, and polyanhydride are used to cross-link the polyethylene glycol. The composite PCM generally comprises at least about 50% by weight of polyethylene glycol, so that a polyethylene glycol matrix is formed. An exemplary composite PCM includes from about 50% by weight to about 90% by weight of polyethylene glycol.

An exemplary phase change material filler is a compound or a blended composition that is selected according to the compound's or composition's phase change temperature and compatibility with the network or matrix materials, e.g., the polyethylene glycol. For example, the phase change material filler may be a paraffin, fatty alcohol, and/or fatty acid, or combinations thereof. In exemplary embodiments, the phase change material is a saturated straight chain alkane such as, for example, tetradecane, hexadecane, octadecane, eicosane, docosane, tetracosane, hexacosane, octacosane, or the like. In exemplary embodiments, the phase change material is a fatty alcohol, such as, for example, capric alcohol, lauryl alcohol, myristyl alcohol, cetyl alcohol, stearyl alcohol, or the like. In exemplary embodiments, the phase change material is a fatty acid, such as, for example, caprylic acid, capric acid, lauric acid, myristic acid, palmitic acid, stearic acid, or the like.

It is also contemplated that renewable materials, such as those disclosed in US 2011/0056622 A1, may also be used as the phase change material filler. For example, renewable phase change material fillers may be derived from agricultural products, such as biomass, i.e., animal products and plants, including soybean, palm, coconut, sunflower, rapeseed, cottonseed, linseed, caster, peanut, olive, safflower, evening primrose, borage, carboseed, and animal tallow. The renewable phase change material fillers can include the oils, fats, fatty acids or fatty-acid derivatives of the selected agricultural starting material or materials. Exemplary renewable phase change materials are fatty acids, fatty acid-derivatives and mixtures derived from renewable sources such as soybean, palm, coconut, sunflower, rapeseed, cottonseed, caster, peanut, olive or animal products.

Generally, the composite PCM contains about 10 weight percent (wt. %) or more of the phase change material filler, up to a total of about 50 wt. %, i.e., from about 10 to about 50 wt. % phase change material filler. An exemplary composite PCM contains from about 30 to about 40 wt. % of phase change material filler. Additives, if used, include, for example, surfactants, nucleating agents, reinforcers and/or plasticizers.

In accordance with an exemplary embodiment, the composite PCM includes a surface coating that is chemically bonded to the matrix material. An exemplary surface coating is a polyurethane surface coating. Chemical bonding between the surface coating and the matric material occurs readily as, prior to curing, components of the polyurethane solution resemble chemical structures present in the polyethylene glycol matrix. In an exemplary embodiment, the surface coating is formed as a layer having a thickness of from about 10 to about 100 microns. An exemplary surface coating may be formed by a process such as spray, dip, or scroll coating.

Method of manufacturing composite PCMs are provided. In an exemplary method, the matrix material, phase change material filler, a cross-linker, and optionally, additives, are blended, cured, and then coated with a surface coating. In accordance with an exemplary embodiment, all components of the composite PCM (except the surface coating) are added into a solvent before curing and are mixed or dispersed to uniformity in a solution or dispersion. Next, the solution of the mixture or dispersion is cast into a mold. Then, the solvent may be volatized. After the solvent is volatilized or otherwise removed, the composite is cured under room temperature or heated in an oven, such as for several hours. The shape and thickness of the composite PCM formed are dependent on the mold that is utilized, the volume of the composite, and curing conditions. In an exemplary embodiment, the composite PCM is formed as a film. After the cured composite PCM is removed from the mold, the composite PCM can be cut into shapes, sheets or pieces suitable for temperature regulating clothing. Then, each shape, sheet or piece of the composite PCM is coated with surface coating material. Therefore, the shape, sheet or piece of composite PCM can be integrated into an article of clothing. For example, sheets of the composite material can be integrated into vests, shirts, jackets, trousers, gloves, shoes by placing the sheets into the article of clothing (e.g., as part of or under a shoe insole), or sewn into an article of clothing, (e.g., placed between fabric layers).

An exemplary matrix material may be formed as a xerogel. For example, in accordance with an exemplary embodiment, xerogels, prepared from polyethylene glycol and polyisocyanate, are utilized as a matrix material for supporting and bearing a paraffin phase change material filler. The xerogels may be used to form a shape-stabilized composite PCM. Suitable reagents used to prepare such a shape-stabilized composite PCM include: polyethylene glycol, polymeric hexamethylene diissocyanate (HDI) trimer as cross-linker, dibutyltin dilaurate (DBTDL) as catalyst, octadecane as phase change material filler, surfactants, solvents, and other additives. In particular, octadecane is used as a phase change material filler based on a melting point (approximately 28° C.), high latent heat, inertness and nontoxicity.

In accordance with an exemplary embodiment, a multi-isocyanate group, hexamethylene isocyanate (HDI) trimer, is used as a cross-linker to prepare xerogel of polyethylene glycol. Desmodur® N3300, available from Bayer MaterialScience, a viscous and colorless liquid under room temperature, may be employed as the HDI timer for use as a cross-linker.

Polyethylene glycol has telechelic hydroxyl groups at the both ends of its molecular chain. Accordingly, reagents that have multi-functional groups able to form covalent bonds with hydroxyl groups, and that have a degree of functional group greater than three, are suitable as cross-linkers in the preparation of the xerogels as contemplated herein. Examples of cross-linkers include, but are not limited to, epoxies, anhydrides, carboxylic acids, and/or mixtures thereof.

It is noted that excessive or insufficient numbers of isocyanate groups may lead to imbalances of equivalent molar ratios. In such cases, a xerogel may have weak mechanical strength because of lower cross-linking density. Accordingly, the molar ratios of isocyanate and hydroxyl groups are optimized to ensure that a flexible and tough xerogel film with elasticity is obtained.

In accordance with an exemplary embodiment, a variety of catalysts may be used to accelerate the reaction rate between isocyanate and hydroxyl groups. In one embodiment, dibutyltin dilaurate (DBTDL), is used to catalyze the formation of xerogel networks, as a relative small amount can speed up a curing process dramatically. Other catalysts include, but are not limited to, organic-bismuth, zinc, and zirconium catalysts.

In accordance with an exemplary embodiment, the function of the solvent in the process of preparing xerogels is to dissolve and blend all of the components, including polyethylene glycol, cross-linker(s), and catalyst(s). Then, via the evaporation of solvent, curing proceeds and a xerogel film is formed. Suitable solvents include, but are not limited to, methylene chloride ($CH_2Cl_2$), chloroform, toluene, xylene, tetrahydrofuran (THF), and/or mixtures thereof, based on good solubility characteristics at room temperature.

In an exemplary embodiment, a surface coating or outer layer is coated on the film of xerogel to prevent seepage and to protect the composite PCM from humidity. A suitable coating material includes aliphatic polycarbonateester-polyether polyurethane dispersions. An exemplary aliphatic polycarbonateester-polyether polyurethane dispersion is commercially available as Impranil® DLU, available from Bayer MaterialScience, which has good barrier properties and good adhesion with the other components of the composite PCM.

The processes as contemplated herein for the preparation of xerogel have two primary stages, solution and casting. For example, in the solution stage, polyethylene glycol, octadecane, and dichloromethane are added into a flask with a stirrer. Afterwards, the cross-linker and catalyst are added into the solution as well. A "pre-reaction" proceeds under stirring, such as for from about 0.5 to about 1 hour, until the viscosity of solution increases dramatically. An example of a xerogel reaction scheme is shown in FIG. 1. As shown in FIG. 1, polyethylene glycol with a chain length "n" and polymeric hexamethylene diissocyanate (HDI) trimer react under catalyst DBTDL in solvent methylene chloride to form a matrix is formed having cross-linking points (illustrated as solid dots) are interconnected by polyethylene glycol chain segments (illustrated as winding lines). It is noted that the phase change material filler is not illustrated in FIG. 1.

In the casting stage as contemplated herein, a xerogel film is prepared with a casting-drying method. The solution after the above pre-reaction is cast into a mold. An exemplary mold has a polytetrafluoroethylene (PTFE) surface coating to allow smooth removal of the cured composite from the mold. To volatize the solvent, the mold holding the solution is laid inside an air exhausting device. Films of xerogel are formed as a result of the volatilization of solvent. Thereafter, the films of xerogel are removed from the mold. These films can subsequently be cut into required shapes for further performance testing or use.

The following example is not intended to limit embodiments herein in any way and is merely presented to illustrate the formation of a composite phase change material described above.

Example 1

Figure 2:
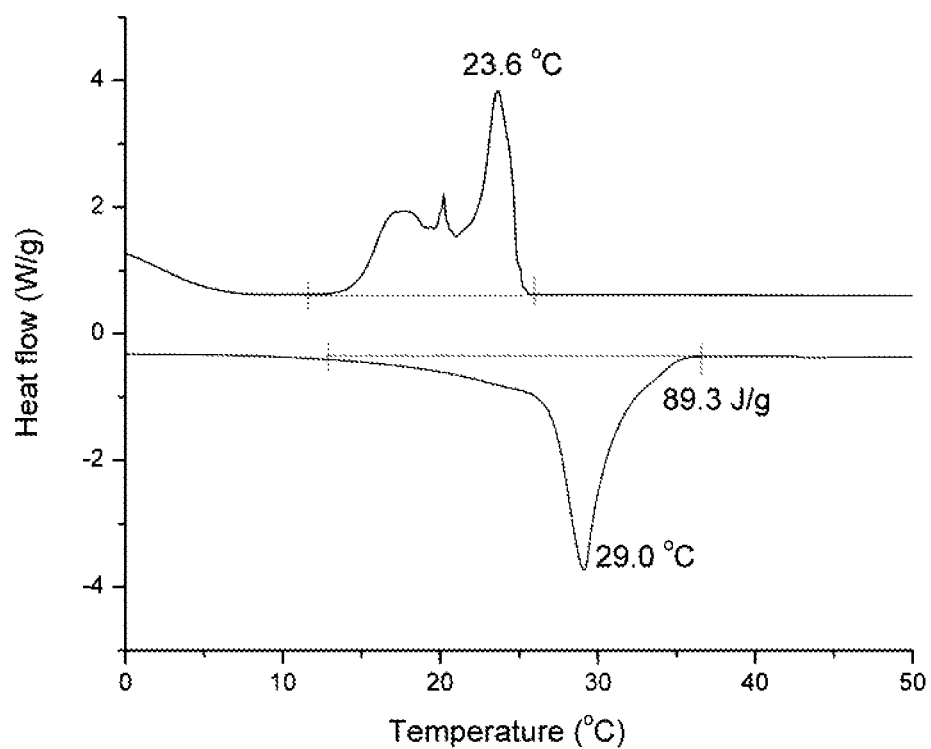
FIG. 2 shows a differential scanning calorimetry (DSC) curve for a composite phase change material formed according to Example 1.

Polyethylene glycol (70 g) and octadecane (30 g) were dissolved in methylene chloride (280 ml). Tween 80 (2.5 grams), a surfactant, was added. HDI trimer and DBTDL were then added into the solution, and the solution was allowed to pre-cure for about 1 hour. The solution was cast into a mold, and the solvent was volatilized. After about 4 hours, a cured composite PCM was formed, such as in the form of a film. Finally, a surface coating was coated on the surface of the composite PCM film. A DSC curve of the composite PCM can be found in FIG. 2, showing a phase change temperature of about 29° C. and a latent heat of phase change of about 89 J/kg.

Figure 3:
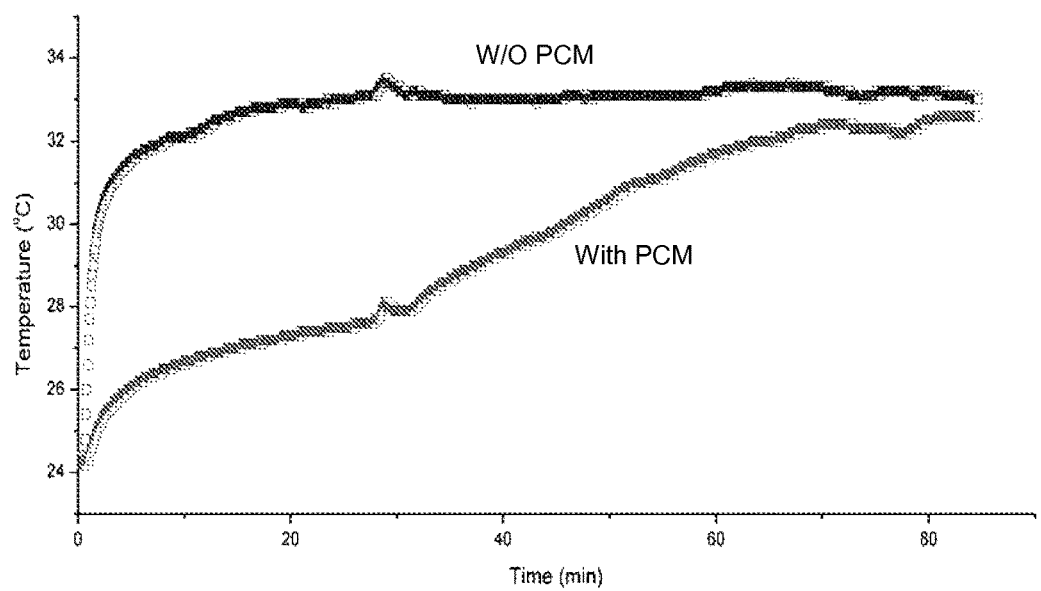
FIG. 3 shows the temperature variations between safety shoes with and without the composite phase change material formed according to Example 1.

The composite PCM film was cut into the shape of insoles applied in safety shoes. The temperature variations between safety shoes with and without PCM were monitored and recorded as shown in FIG. 3. This testing was carried out when safety shoes were worn at around room temperature (from about 23 to about 24° C.). As can be seen, composite PCM film applied as a cooling insole can dramatically delay the increase of temperature in safety shoes.

As noted above, articles of clothing are provided herein. An exemplary article of clothing includes a composite PCM. An exemplary PCM includes a cross-linked polyethylene glycol matrix and a phase change material filler. Each of the cross-linked polyethylene glycol matrix and the phase change material filler has a phase change temperature of from about 10 to about 60° C. Further, the composite phase change material in the article of clothing has a latent heat of enthalpy greater than about 50 kJ/kg. An example composite phase change material in the article of clothing has a phase change material filler content of from about 10 to about 50 wt. %, such as from about 30 to about 40 wt. %. An exemplary phase change material filler is a paraffin, such as octadecane. An exemplary composite PCM includes an outer coating to prevent seepage of the phase change material filler from the composite into or onto the article of clothing. An exemplary article of clothing may enclose or hold the composite PCM, such as between layers of the article of clothing. In an exemplary embodiment, the composite PCM is sewn into the article of clothing.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A composite phase change material comprising:
   a cross-linked polyethylene glycol matrix in the form of a xerogel; and
   a phase change material filler,
   wherein each of the cross-linked polyethylene glycol matrix and the phase change material filler has a phase change temperature of from about 10 to about 60° C., and wherein the composite phase change material has a latent heat of enthalpy greater than about 50 kJ/kg; and
   wherein said cross-linked polyethylene glycol is cross-linked with a polyisocyanate crosslinking agent, an epoxy crosslinking agent, an anhydride crosslinking agent, a carboxylic acid crosslinking agent or a mixture thereof.

2. The composite phase change material of claim 1, wherein the phase change material filler is from about 10 to about 50 wt. % of the composite phase change material.

3. The composite phase change material of claim 2, wherein the phase change material filler is from about 30 to about 40 wt. % of the composite phase change material.

4. The composite phase change material of claim 1, wherein the phase change material filler is octadecane and wherein the crosslinking agent is hexamethylene diisocyanate.

5. The composite phase change material of claim 1, further comprising an outer coating to prevent seepage of the phase change material filler from the composite, wherein said coating is a continuous layer on and surrounding the cross-linked polyethylene glycol matrix and wherein said coating is chemically bonded to the matrix.

6. The composite phase change material of claim 5, wherein said outer coating comprises a polyurethane.

7. The composite phase change material of claim 6, wherein said xerogel comprises isocyanate groups.

8. The composite phase change material claim 6, wherein said outer coating has a thickness of from about 10 microns to about 100 microns.

9. The composite phase material of claim 1, wherein the cross-linked polyethylene glycol matrix consists of cross-linked polyethylene glycol and wherein the phase change material filler further comprises a nucleating agent, reinforcer, plasticizer and/or a mixture thereof.

10. The composite phase change material of claim 1, wherein said phase change material filler is a free phase change material filler that is immobilized and entangled in the matrix.

11. The composite phase change material of claim 1, wherein said composite phase change material is cured and shape-stabilized.

12. The composite phase change material of claim 1, wherein said cross-linked polyethylene glycol is cross-linked with a polyisocyanate crosslinking agent.

13. The composite phase change material of claim 1, wherein said crosslinked polyethylene glycol is crosslinked with an epoxy crosslinking agent.

14. The composite phase change material of claim 1, wherein said crosslinked polyethylene glycol is crosslinked with an anhydride crosslinking agent.

15. The composite phase change material of claim 1, wherein said crosslinked polyethylene glycol is crosslinked with a carboxylic acid crosslinking agent.

16. The composite phase change material of claim 1, wherein the crosslinking agent has a degree of functional groups greater than three.

17. The composite phase change material of claim 1, wherein the crosslinked polyethylene glycol matrix has crosslinking points that are interconnected by polyethylene glycol chain segments.

* * * * *